(12) United States Patent
Parker et al.

(10) Patent No.: US 11,196,552 B2
(45) Date of Patent: Dec. 7, 2021

(54) SECURE DATA DISTRIBUTION PROTOCOL USING BLOCKCHAINS

(71) Applicant: Truss Financial, LLC, Boston, MA (US)

(72) Inventors: John Gray Parker, Boston, MA (US); Eric Najjar, Forest Hills, NY (US); Braden Gibson, Riverview, FL (US)

(73) Assignee: Truss Financial, LLC, Boston, MA (US)

( * ) Notice: Subject to any disclaimer, the term of this patent is extended or adjusted under 35 U.S.C. 154(b) by 10 days.

(21) Appl. No.: 16/056,325

(22) Filed: Aug. 6, 2018

(65) Prior Publication Data

US 2019/0044714 A1 Feb. 7, 2019

Related U.S. Application Data

(60) Provisional application No. 62/541,251, filed on Aug. 4, 2017.

(51) Int. Cl.
*G06F 16/18* (2019.01)
*G06F 16/182* (2019.01)
*G06F 16/27* (2019.01)
*H04L 9/06* (2006.01)
*H04L 9/08* (2006.01)
*H04L 9/32* (2006.01)

(52) U.S. Cl.
CPC .......... *H04L 9/0861* (2013.01); *G06F 16/182* (2019.01); *G06F 16/1805* (2019.01); *G06F 16/27* (2019.01); *H04L 9/0643* (2013.01); *H04L 9/321* (2013.01); *H04L 9/3226* (2013.01); *H04L 9/3239* (2013.01); *H04L 9/3247* (2013.01); *H04L 2209/38* (2013.01)

(58) Field of Classification Search
CPC ... H04L 9/0861; H04L 9/3239; H04L 9/0643; H04L 2209/38; H04L 9/3226; H04L 9/3247; H04L 9/321; G06F 16/27; G06F 16/182; G06F 16/1805; G06F 16/273; G06F 16/275
See application file for complete search history.

(56) References Cited

U.S. PATENT DOCUMENTS

| | | | |
|---|---|---|---|
| 10,097,356 B2 * | 10/2018 | Zinder | G06F 21/6254 |
| 10,476,665 B1 * | 11/2019 | Griffin | H04L 9/088 |
| 10,536,445 B1 * | 1/2020 | Lerner | G06F 21/64 |
| 2017/0206523 A1 * | 7/2017 | Goeringer | G06Q 20/409 |

(Continued)

OTHER PUBLICATIONS

Nakamoto, Bitcoin: A Peer-to-Peer Electronic Cash System, Oct. 31, 2008, pp. 1-9 (Year: 2008).*

(Continued)

*Primary Examiner* — Jorge A Casanova
(74) *Attorney, Agent, or Firm* — Kilpatrick Townsend & Stockton LLP

(57) ABSTRACT

One or more systems and methods are presented for secure data communications utilizing blockchains. One or more systems and methods may utilize multiple blockchains to provide an immutable cryptographically linked set of blocks. Each of these blocks may contain one or more actions associated with a computer network. In one embodiment, a trusted third party may be utilized to authenticate and/or verify data prior to inputting data into one or more blockchains.

17 Claims, 6 Drawing Sheets

(56) References Cited

U.S. PATENT DOCUMENTS

2017/0337534 A1* 11/2017 Goeringer ............ G06Q 50/188
2018/0068130 A1*  3/2018 Chan ...................... G06F 21/64
2020/0067697 A1*  2/2020 Puddu ................. G06F 16/9027

OTHER PUBLICATIONS

Crosby et al., BlockChain Technology Beyond Bitcoin, Oct. 16, 2015, pp. 1-35 (Year: 2015).*
Jimi S., Blockchain Terminology: The 35 Most Commonly Used Blockchain Terms Explained, Feb. 27, 2019, pp. 1-14 (Year: 2019).*
Jimi S., Blockchain Explained: How a 51% Attack Works (Double Spend Attack), May 5, 2018, pp. 1-9. (Year: 2018).*

* cited by examiner

SECURE DATA DISTRIBUTION PROTOCOL USING BLOCKCHAINS

CROSS-REFERENCES TO RELATED APPLICATIONS

The present application claims benefit to U.S. Provisional Application No. 62/541,251 entitled "CUSTOMIZABLE PLATFORM FOR MANAGING TOKEN ISSUANCE AND TRADING USING BLOCKCHAINS" filed Aug. 4, 2017, the entire contents of which are incorporated herein by reference for all purposes.

FIELD OF INVENTION

The present invention relates, in general, to data communication between multiple parties, more particularly, to immutable data communication between multiple parties using blockchains.

BACKGROUND

Presently, data communication systems allow for a plurality of users and/or devices to communicate with each other. However, as the amount of communications grow, so does the need immutably secure those communications. For example, in order for a first device to send a second device a specific set of data, the first device may need to verify a set of data communications between a third and fourth device of the same network. Hence, there is a need to create a platform that makes data communications within a network secure and immutable.

BRIEF DESCRIPTION OF THE DRAWINGS

Understanding of the advantages described here within may be realized by reference to portions of the specification and drawings. Like reference numerals are used throughout the several drawings to refer to similar components. In some instances, the drawings are not to scale. In some instances, a sub-label is associated with a reference numeral to denote one of multiple similar components. When reference is made to a reference numeral without specification to an existing sub-label, it may refer to all such multiple similar components.

SUMMARY OF THE INVENTION

Figure 1:
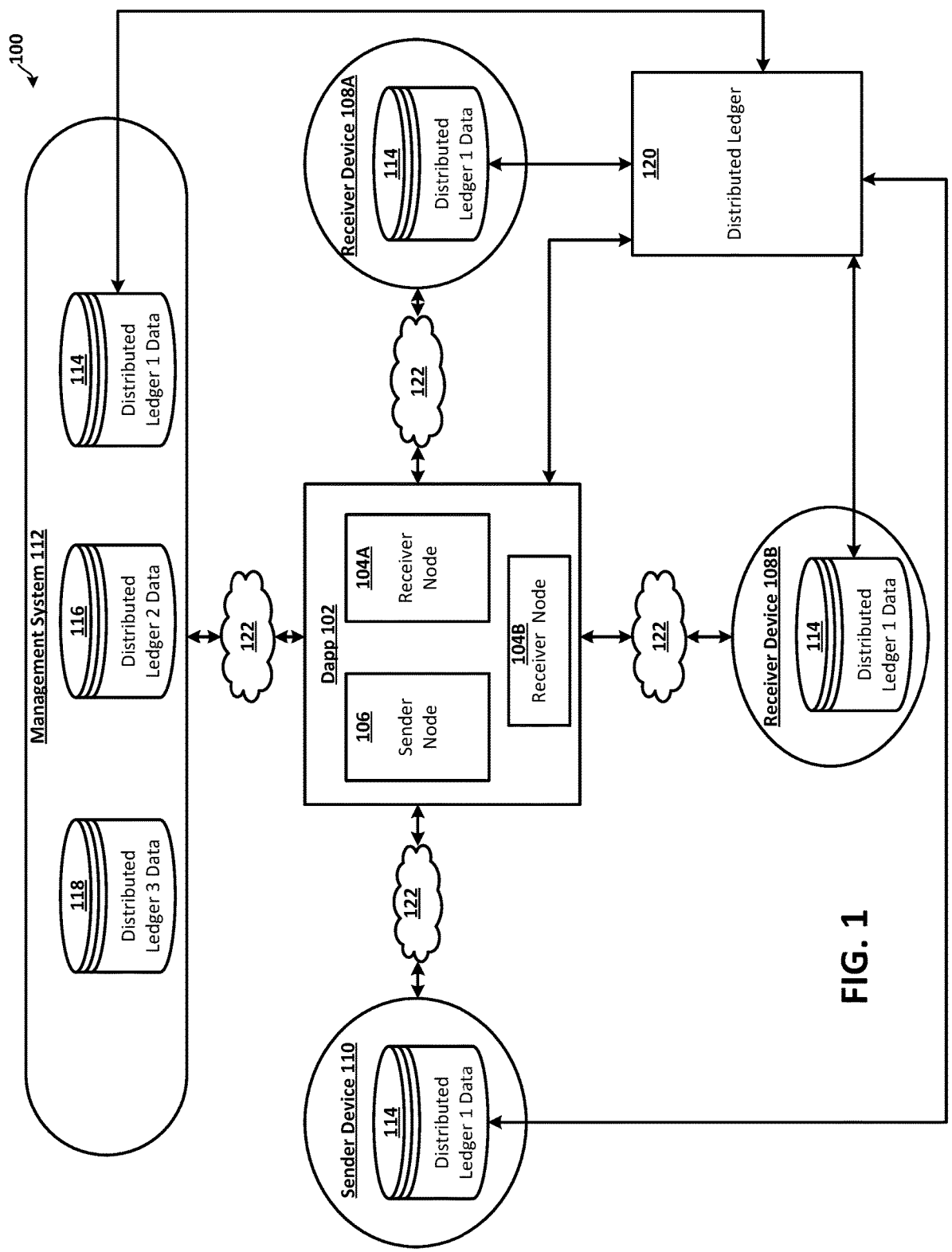
FIG. 1 illustrates a schematic diagram of a computer network, in accordance with various embodiments of the present invention.

In some embodiments, system and methods are provided for secure data distribution within a blockchain environment. In one embodiment a method may include receiving from a sending device, one or more first communications that correspond to a request to generate a custom blockchain. The one or more first communications including token parameters. The method may further include initializing a sender node and initializing a receive node. The method may further include writing the sender node into a first block in the custom blockchain, the sender node being associated with a first blockchain address. The method may further include writing the receiver node into a second block in the custom blockchain, the receiver node being associated with a second blockchain address. The method may further include receiving, by the sender node, at least one token parameter of the plurality of token parameters and at least one distribution parameter. The method may further include initializing, based on the at least one token parameter, a first distributed ledger, the first distributed ledger identifying one or more actions associated with the custom blockchain. The method may further include receiving, by receiver node, a cryptographically signed request for custom tokens associated with the custom blockchain. The cryptographically signed request being generated based at least on, a private key associated with a receiving device. The method may further include comparing, by the receiver node, one or more receiver conditions associated with the cryptographically signed request to one or more actions identified in the first distributed ledger to determine if the one or more receiver conditions are satisfied. The method may further include transmitting, from the receiver node to the sender node, the cryptographically signed request. The method may further include comparing, by the sender node, data associated with the cryptographically signed request to the at least one distribution parameter to determine if a distribution condition is satisfied. The method may further include in response to determining that the distribution condition has been satisfied, generating, by the sender node, a token distribution response. The method may further include broadcasting, by the sender node, the token distribution response to a plurality of computing devices associated with the custom blockchain. The method may further include writing, by one of the plurality of computing devices associated with the custom blockchain, the token distribution response in a third block of the custom blockchain. The method may further include modifying the first distributed ledger to include the token distribution response. The method may further include retrieving, by the receiving device, the first distributed ledger.

In one embodiment, the first block and the second block are a same block. In one embodiment, the first and second blocks are older than the third block within the custom blockchain.

In one embodiment, the plurality of computing devices associated with the custom blockchain includes the first receiving device and the first sending device. In one embodiment, the token parameters include one or more of an initial token value or initial token supply. In one embodiment, the distribution parameters include a minimum value or a geographic region.

In one embodiment, the method further includes receiving, by the sender node, an allocation parameter. The method may further include querying, by the sender node, one or more data sources, to retrieve data associated with the allocation parameter. The method may further include generating, by the sender node, based on the data associated with the allocation parameter, an allocation response. The method may further include broadcasting, by the sender node. The allocation response to a plurality of computer devices associated with an original blockchain, the custom blockchain being distinct from the original blockchain. The method may further include modifying a second distributed ledger to include the allocation response, the second distributed ledger being associated with the original blockchain.

One or more embodiments of the present disclose offers several technical advantages over known data distribution systems. One or more embodiments provides an immutable cryptographically linked chain of blocks that contain self-executing protocols for data communication. The cryptographically linked chain of blocks may be an improvement to the operation of computers as it allows for one or more transactions within the chain of blocks to cryptographically immutable. For example, in prior data communication systems, there may be hundreds, thousand, or millions of communications between devices in a system. When a request is received for the records associated with those communications it may be possible that the record has been maliciously altered. By implementing an immutable cryptographically linked chain of blocks it may assure that a record of communications has not been altered, which increases the security of computer systems.

One or more embodiments provides an immutable cryptographically linked processes. In traditional systems, computer protocols may be altered or updated without the knowledge of all parties (e.g., covertly pushing a software update.) By implementing an immutable cryptographically linked blockchain to store one or more computerized processes, the code implementing those processes is immutable and may not be changed. This may prevent malicious actors from modifying computer protocols to their advantage, which increases the security of a computer system and computerized protocols.

One or more embodiments provide a trusted third party to reduce transactions cost within a blockchain environment. In blockchain environments, every transactions within the blockchain may be written to one or more blocks in the blockchain. In some systems, each transaction may have a transaction cost. To save on transactions cost, one or more communications associated with a blockchain may be performed outside of a blockchain by a trusted third party. In such an embodiment, transaction costs as well as processing power associated with creating blocks in a blockchain may be reduced, allowing for the blockchain to operate in a more efficient manner. In addition, the trusted third party may authenticate and/or authorize various data sets prior to inputting the datasets into one or more blocks in the blockchain. In such an embodiment, the trusted third-party adds a layer of security to the blockchain by inputting trusted information into the blockchain. Furthermore, by inputting this trusted information it prevents one more computerized protocols within a blockchain from having to verify or authenticate data. If a computerized protocol within the blockchain performed verification and authentication it may slow or throttle a blockchain platform with a copious amount of transactions and may require increased transaction costs and computational power. Other advantageous may associated with one or more embodiments of the disclosure and may be apparent to those skilled in the art.

DETAILED DESCRIPTION OF THE INVENTION

While various aspects of embodiments have been summarized above, the following detailed description illustrates exemplary embodiments in further detail to enable one of skill in the art to practice the invention. In the following description, for the purposes of explanation, numerous specific details are set forth in order to provide a thorough understanding of the present disclosure. It will be apparent, however, to one skilled in the art, that one or more or all embodiments described in the disclosure may be practiced without some of these specific details. Several embodiments are described below and, while various features are ascribed to different embodiments, it should be appreciated that the features described with respect to one embodiment may be incorporated with another embodiment as well.

FIG. 1 illustrates a schematic illustration of computer network 100. Computer network 100 may facilitate immutable and cryptographically secure data communication between one or more components of computer network 100. Computer network 100 may implement blockchain-based technology in one or more embodiments. A blockchain may be described as a chain of blocks that are cryptographically interlocked. For example, a first block in a blockchain may comprise a first plurality of data. This data may be then cryptographically hashed, for example, by Secure Hash Algorithm-256 bit (SHA-256), to form a first block hash. A second block may comprise a second plurality of data and the first block hash. The second block may be then cryptographically hashed to form a second block hash. The second block hash may be used as an input into a third block and so forth. By using the previous block's hash as an input into the current block, the blocks in a blockchain are cryptographically interlocked. This cryptographic interlocking may create an immutable data chain because a change in a prior block would modify the hash of that prior block and subsequent blocks. As a result, a change in a prior block of a blockchain may be easily detected.

The phrase "write to a block", "writing to a block", and like phrases may be used throughout the disclosure. As used in this disclosure, when a device "writes" data to a block in a blockchain it may mean that the device broadcasts the data to one or more components of computer network 100. Subsequently, one or more components of computer network 100 may process the data (along with other data in a block) to produce the block in the blockchain (i.e. add the block containing the data to the blockchain).

Computer network 100 comprises a decentralized application 102 (i.e. Dapp 102), a receiver device 108A, a receiver device 108B, a sender device 110, a management system 112, a distributed ledger 120, and networks 122. Although, only two receiver devices are shown in the illustrated embodiment of computer system 100, a plurality of receiver devices (e.g. 100, 50, etc.) may be implemented in computer system 100. Similarly, although, only one sender device is shown in the illustrated embodiment of computer system 100, a plurality of sender devices (e.g. 100, 50, etc.) may be implemented in computer system 100.

Decentralized application 102 may be an application that partly or fully exists in a plurality of devices (e.g., sender device 110, receiver device 108A, receiver device 108B, and management system 112) via a blockchain. In one embodiment, decentralized application 102 comprises sender node 106, receiver node 104A and receiver node 104B. Sender node 106, receiver node 104An and receiver node 104B may be implemented each as a computerized protocol that may, based upon one or more conditions, facilitate, manage, verify and/or control one or more transactions associated with decentralized application 102. In one embodiment, sender node 106, receiver node 104A and receiver node 104B may be written into one or more blocks in of a blockchain. For example, management system 112 may write the computerized protocol that defines sender node 106, receiver node 104A, and receiver node 104B into a first block of a blockchain. The first block may be then processed by one or more components of computer network 100 and added to the blockchain. A subsequent blocks in the blockchain would use the hash of the first block as an input. The cryptographic interlocking process permanently adds the computerized protocols that define sender node 106, receiver node 104A, and receiver node 104B into a blockchain. By putting sender node 106, receiver node 104A, and receiver node 104B onto a blockchain, the protocols defining each node may be immutable. In one embodiment, sender node 106, receiver node 104A, and receiver node 104B may be written into different blocks of a blockchain. For example, sender node 106 may be written to a first block of a blockchain, receiver node 104A may be written to a second block in the blockchain, and receiver node 104B may be written to a third block in the blockchain. In one embodiment, receiver node 104A and receiver node 104B may be a single node. In one embodiment, sender node 106, receiver node 104A, and receiver node 104B may be implemented as blockchain-based smart contracts.

Sender node 106 may create a customized blockchain with a distributed ledger, control distribution of tokens associated with the distributed ledger and control allocation of received resources. In one embodiment, sender node 106 may receive token parameters from management system 112 and create a customized blockchain based on the token parameters. The creation of the customized blockchain may initialize distributed ledger 120. In one embodiment, sender node 106 may receive distribution parameters from sender device 110 or management system 112 that indicate one or more distribution conditions that may be satisfied in order to distribute one or more tokens associated with the custom blockchain. In one embodiment, sender node 106 may receive allocation parameters from management system 112 that indicate one or more allocation conditions that may be satisfied in order to allocate received resources associated with receiver device 108A and/or receiver device 108B. In one embodiment, the customized blockchain created by sender node 106 may be built on top of an underlying pre-existing blockchain.

Receiver nodes 104A and 104B may receive cryptographically signed token requests from one or more receiver devices. The cryptographically signed token requests may comprise receiver parameters that may identify receiver conditions that may be satisfied in order to transmit the cryptographically signed token request to sender node 106. In one embodiment, cryptographically signed token requests may include a resource associated with a receiver device. Upon transmitting the cryptographically signed token request to the sender node 106, a receiver node may also allocate an associated resource to sender node 106. The receiver parameters may be included in the cryptographically signed token requests and may define or more receiver conditions that must be satisfied prior to a receiver node sending the received cryptographically signed token request to sender node 106. In one embodiment, sender node 106 may also receive cryptographically token requests that are from receiver node 104A or receiver node 104B. In one embodiment, each receiver device within computer network 100 may have a corresponding receiver node. In one embodiment, all receiver devices within computer network 100 may share a single receiver node.

Receiver devices 108A and 108B may be computerized user or client devices. Receiver devices 108A and 108B may be implemented as computers, cellular phones, mobile phones, smart phones, desktop computers, mobile computers, computer servers, and the like. Receiver devices 108A and 108B may be associated with users that want to obtain tokens distributed by sender node 106. Receiver devices 108A and 108B may communicate with one or more receiver nodes via networks 122. Receiver devices 108A and 108B may also store distributed ledger data 114. Distributed ledger data 114 may be data associated with distributed ledger 120 and distributed ledger 120 may be initialized in response to the creation of a custom blockchain by sender node 106. Distributed ledger data 114 may include one or more datasets associated with the custom blockchain. For example, distributed ledger data 114 may include one or more blocks that make up the custom blockchain. In such an example, distributed ledger data 114 may include one or more parts of decentralized application 102. In another example, distributed ledger data 114 may include block validator parameters. Block validator parameters may indicate various conditions for producing a block for the custom blockchain and/or an under lying pre-existing blockchain. The block validator parameters may be based on a block validator algorithm. For example, a block validator parameter may indicate that a particular cryptographic puzzle must be solved prior to adding a block to the custom blockchain. In some embodiments, solving a cryptographic puzzle may be implemented by a proof-of-work consensus algorithm. In another example, block validator parameters may indicate a round-robin algorithm that indicates a particular device that is authorized to produce a block for the custom blockchain within a certain period of time. By storing distributed ledger data 114 across a plurality of devices, the custom blockchain within the distributed ledger data 114 may be decentralized because a plurality of devices may contribute to the custom blockchain and also detect if there is an authorized changed to the custom blockchain. By distributing distributed ledger data 114 to a plurality of devices no single point of attack exists for potential malicious actors, which makes the custom blockchain more secure.

Receiver devices 108A and 108B may also execute one or more computerized protocols in the customized blockchain and/or in the underlying pre-existing blockchain. For example, decentralized application 102 may be one or more blocks in the underlying pre-existing blockchain. Whenever one or more functions of decentralized application 102 is utilized, a device (e.g., receiver devices 108A, receiver device 108B, sender device 110, management system 112) holding decentralized application 102 via distributed ledger data 114 may execute the protocol. In one embodiment, which device executes one or more functions associated with decentralized application 102 may be determined by a block validator algorithm.

Sender device 110 may be computerized user or client devices. Sender device 110 may be implemented as a computer, cellular phone, mobile phone, smart phone, desktop computer, mobile computer, computer server, and the like. Sender device 110 may be associated with a user that wants to distribute one or more tokens in exchange for one or more resources. Sender device 110 may communicate with sender node 106 via networks 122. Sender device 110 may also store and execute one or more parts of distributed ledger data 114.

Management system 112 may comprise a computerized server or database that manages one or more aspects of computer network 100. In one embodiment, management system 112 may receive a request associated with sender device 110 to create a customized blockchain. Management system 112 may generate one or more parts or all of decentralized application 102 based on the request. In one embodiment, in order to generate one or more parts of decentralized application 102, management system 112 may write, to a first block in an underlying pre-existing blockchain, one or more parts of decentralized application 102 (e.g., sender node 106 and receiver nodes 104A and 104B). This first block may be processed by management system 112 or another device in computer network 100. Management system 112 may transmit to sender node 106 of decentralized application 102, one or more token parameters. Sender node 106 may then initialize distributed ledger 120 according to the token parameters. For example, the token parameters may indicate to sender node 106 to create 10,000 authentication tokens. This initial creation of the authentication tokens may be included in a block within the custom blockchain which may be indicated in an entry in distributed ledger 120.

Management system 112 may also transmit to sender node 106 allocation parameters that indicate to sender node 106 allocation conditions associated with the created tokens (e.g., the authentication tokens). These allocation conditions may indicate a certain rules for allocation one or more received resources associated with created tokens. In one embodiment, management system 112 may act as a trusted-party for a customized blockchain. Management system 112 may write one or more data sets into a block that may be used by sender node 106 to verify one more conditions (e.g. allocation conditions). For example, an allocation condition may require that a permit be filed with a government agency. Management system 112, may query a database associated with the government agency to determine that a permit has been filed and may write "a permit in accordance with allocation condition 2554 has been retrieved by the management system" to a block in the customized blockchain. This block in distributed ledger 120 may be referenced by sender node 106 to determine if allocation condition 2554 has been met. Treating management system 112 as a trusted party may reduce the cost of the customized blockchain. In a some underlying pre-existing blockchain platforms (e.g. Ethereum and Stellar Lumens) there may be a transaction cost associated with each transaction on the underlying pre-existing blockchain. For example, if sender node 106 was to query a database associated with a government agency to determine if an allocation condition was met, this may result in a transaction cost as this action may be written to a block in the underlying pre-existing blockchain. Thus, allowing a trusted party to retrieve and/or verify data and subsequently write the data into a block in the customized blockchain may reduce transaction costs associated with operating on top of an underlying pre-existing blockchain.

In some embodiments, management system 112 may store several distributed ledger data sets (e.g., distributed ledger data 118, distributed ledger data 116, and distributed ledger data 114) that each may correspond to a different customized blockchain. As a result, management system 112 may create and help maintain several different custom blockchains. In one embodiment, each customized blockchain may run on top of an underlying pre-existing blockchain. For example, a customized blockchain may run on the Stellar Lumens (Stellar) blockchain platform. In such an example, a customized blockchain may be a subset of an underlying pre-existing blockchain and distributed ledger 120 may be a subset of a distributed ledger associated with the underlying pre-existing blockchain. For example, when management system 112 writes a block on the custom blockchain, the block may be also a part of the Stellar blockchain. In one embodiment, the custom blockchain may be a filtered version of the underlying pre-existing blockchain. By utilizing an existing blockchain platform, the customized blockchain may inherent established blockchain protocols such as censuses algorithms and block validator algorithms from the existing blockchain platform.

Distributed ledger 120 may represent one or more blocks of a customized blockchain. In one embodiment, distributed ledger 120 may represent the blocks (and the data within the blocks) of the customized blockchain. For example if a block includes the action "sender node 106 allocates 10 authentication tokens to receiver device 108A." Distributed ledger 120 may contain an entry of "sender node 106 allocates 10 authentication tokens to receiver device 108A." In one embodiment, a copy of distributed ledger 120 is stored in distributed ledger data 114. By storing a copy of distributed ledger 120, one or more components of computer network 100 may not only add blocks (if certain validation requirements are met via a validator algorithm) to the custom blockchain, but also view all the entries in the blocks of the custom blockchain.

Networks 122 may be any network that supports communications within computer network 100. In one embodiment, networks 122 may be implemented by the Internet, a wide area network (WAN), a local area network (LAN), 3G mobile network, 4G mobile network, 5G mobile network, fiber optic network, or other backbone communication system. In one embodiment, networks 122 may include multiple distinct networks. For example, a network between sender device 110 and decentralized application 102 may be different from a network between receiver device 108A and decentralized application 102.

Figure 2:
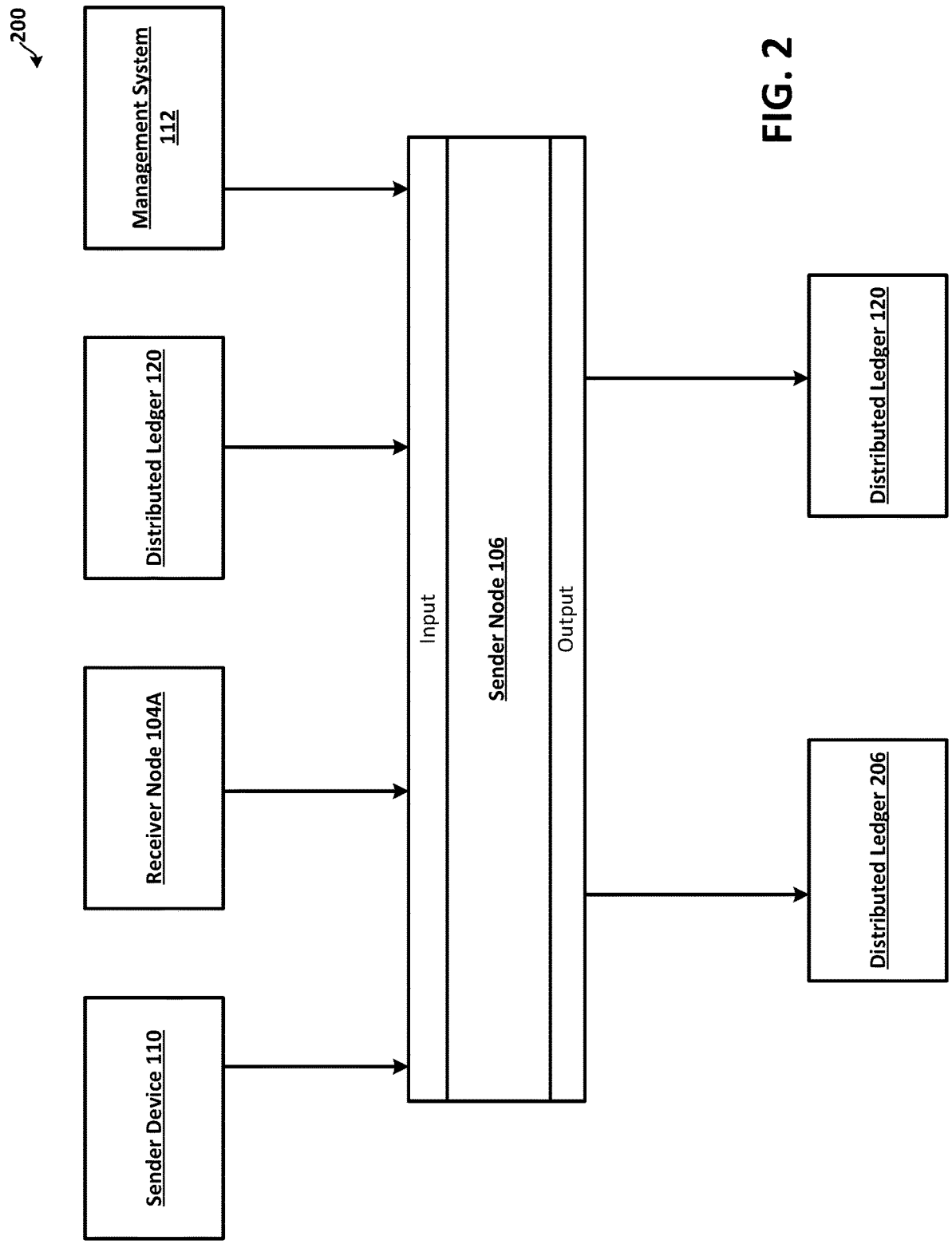
FIG. 2 illustrates a schematic diagram of a sender node, in accordance with various embodiments of the present invention.

FIG. 2 depicts schematic diagram 200 for illustrating example inputs and outputs of a sender node 106. As depicted in diagram 200, sender device 110, receiver node 104A, distributed ledger 120, and management system 112 may transmit data to sender node 106. As depicted in diagram 200, sender node 106 may transmit data to distributed ledger 120 and distributed ledger 206.

Management system 112 may transmit to sender node 106 one or more token parameters. The token parameters may indicate to sender node 106 to create a custom blockchain. Each custom blockchain may have an associated set of tokens. The creation, distribution, transmission, and allocation of each token in the set of tokens may be cryptographically monitored by the custom blockchain. Token parameters may include one or more datasets that may initialize the custom blockchain. For example, token parameters may include a quantity of initial tokens, a name of the initial tokens, access rights associated with the initial token, a value associated with the initial tokens, and the like. The quantity of initial tokens may include a value that indicates to sender node 106 to create a certain quantity of tokens. For example, a quantity of initial tokens value may be 10,000, which indicates to sender node 106 to create 10,000 tokens. The name of initial tokens may include a string that indicates to sender node 106 to associate a name with the created tokens. For example, a name of initial tokens string may be "authentication", which indicates to sender node 106 to name the created 10,000 tokens as "authentication tokens". The access rights associated with the initial token may include an indication of one or more access rights. For example, an access right may include the right (e.g., credentials) to access one or more portions of a computer system, right to equity associated with an entity, the right to access a particular webpage, and the like. For example, an access right may be implemented as a password value that may be attached to one or more of the 10,000 authentication tokens, such that the password may allow access to one or more particular webpages. The value associated with the initial tokens may include a value that indicates to sender node 106 to associate a particular value with one or more of the initial tokens. For example, a value associated with the initial tokens may include a value pairing with an underlying blockchain resource, fiat currency pair, a time change associated with the value pairing, and the like. For example, a value associated with an initial token maybe the string "5 XLM at time 1 and 7.5 XLM at time 2." In response to receiving the string, sender device 106 may associate a value of 5 XLM at time 1 with each of the 10,000 authentication tokens and then a value of 7 XLM at time 2 with each of the 10,000 authentication tokens. In such an example, Stellar is being used as the pre-existing underlying blockchain for the custom blockchain, and sender node 106 is associating a value of 5 XLM for each authentication token at time 1 and a value of 7 XLM for each authentication token at time 2.

Management system 112 may transmit to sender node 106 one or more allocation parameters that indicate to sender node 106 allocation conditions associated with the initial tokens. The allocation parameters may indicate certain rules for allocating resources from sender node 106 to sender device 110. In one embodiment, when a resource is allocated the ownership over the resource is modified. The resources may be received by sender node 106 according to one or more cryptographically signed token requests. The resources may then be associated with an address that is associated with sender node 106 until the allocation conditions are satisfied. Whenever the allocation conditions are satisfied, sender node 106 may allocate the resources to sender device 110 by associating an address that is associated with sender device 110 with the resources. In one embodiment, allocation parameters may indicate to sender node 106 one or more allocation conditions, including but not limited to, a full or partial completion of one or more activities, a quantity of distributed tokens, and a quantity of received resources and the like. Any allocation condition may also have an associated allocation value, which indicates a portion of received resources that may be allocated upon satisfaction of one or more allocation conditions. For example, an allocation condition may be the completion filing a permit with a government agency. An allocation value of 10% may be associated with the allocation condition. In such an example, sender node 106 may query, distributed ledger 120, to determine if an entry in distributed ledger 120 indicates that a permit has been filed with a government agency. In circumstances when an entry in distributed ledger 120 indicates that a permit has been filed with the government agency, sender node 106 may allocate 10% of the received resources. In one embodiment, all entries in distributed ledger 120 utilized to satisfy allocation conditions must be signed by management system 112 (or a trusted party) to be valid. For example, if an entry in distributed ledger 120 indicates that a permit has been filed and this entry is signed by management system 112 then the allocation condition may be satisfied. In another example, if the entry in the distributed ledger indicates that a permit has been filed and this entry is signed by sender device 110 then the allocation condition may not be satisfied. By transmitting, to sender node 106, one or more allocation parameters, management system 112 may control the allocation of resources associated with the customized blockchain.

Management system 112 may authenticate a geographical location identifier within a cryptographically signed token request. In one embodiment, one or more receiver conditions or distribution conditions may require the cryptographically signed token request to be associated with a particular location. In one embodiment, a geographical location may be determined based upon a user's work address, a user's home address, GPS (Global Positioning System) data associated with receiver device 108A, an access point associated with receiver device 108A (e.g., cellular tower, internet access point, and the like) and the like. In one embodiment, to save transactions costs associated with an underlying pre-existing blockchain, management system 112, may, at any time, request location-based location data from receiver device 108A, outside of the custom blockchain and/or the underlying pre-existing blockchain to determine one or more regions to associate with receiver device 108A. The determined region may be then written to the customized blockchain and later utilized by sender node 106 to confirm one or more distribution conditions. For example, a cryptographically signed token request may indicate an associated location of New York. Management system 112 may query receiver device 108A for its location at time 1, and then write the result to a block in the customized blockchain. At time 2, management system may query receiver device 108A for its location and if the location has changed may write the result to a block in the customized blockchain. By utilizing management system 112 to obtain the location of receiver device 108A it prevents sender node 106 from having to message receiver device 108A via custom blockchain and/or the underlying pre-existing blockchain, which may save transactions costs. In addition, management system 112 may be a trusted party, which may mean that any input into a blockchain from management system 112 may be reasonably relied upon by one or more devices in computer network 100. In one embodiment, only location information signed by management system 112 may be relied upon to meet one or more receiver conditions and/or distribution conditions.

Receiver node 104A (and any other receiver node in decentralized application 102) may transmit to sender node 106 a cryptographically signed token request. The cryptographically signed token request may be signed by a private key associated with a receiver device. The cryptographically signed request may be cryptographically monitored by the custom blockchain. The cryptographically signed token request may include an address associated with a receiver device, a token name, a quantity of tokens requested, a geographical location identifier, a resource, and the like. The address associated with a receiver device may indicate an address associated with the cryptographically signed request for tokens. For example, an address may be a 16 alphanumeric value which may identify an account associated with a receiver device that is configured to store received tokens. The token name may indicate the name of a requested token. For example, the token name may be the string "authentication token", which may indicate that the token named "authentication token" is being requested. The quantity of tokens requested may indicate the amount of tokens requested. For example, the quantity of tokens requested may be the value "100", which may indicate that 100 authentication tokens are being requested. The geographical location identifier may include GPS data from receiver device 108A that indicates one or more geographical locations. The resource may indicate one or more resources that may be allocated to sender device 110. A resource may include a one or more authentication credentials that enable access to a location, an asset associated with an underlying blockchain platform (e.g., XLM), and the like. Sender node 106 may associate received resources with its own address until one or more allocation conditions are met.

Sender device 110 may transmit to sender node 106 one or more distribution parameters that may indicate to sender node 106 one or more distribution conditions associated with the initial tokens. These distribution conditions may indicate a certain set of rules for distributing one or more initial tokens. Distribution conditions may include a minimum and maximum resource, a minimum and maximum token quantity, a distribution time period, a geographic location, a user characteristic and the like. The minimum and maximum resource condition may include values that indicate to sender node 106 to reject token requests that contain resources below a minimum threshold or above a maximum threshold. For example, a maximum resource may be 10 resources and a minimum resource requirement may be 1 resource. In such an example, if sender node 106 receives a cryptographically signed token request, from receiver device 108A, that includes 11 resources, the cryptographically signed token request will be rejected and no tokens will be distributed. A minimum and maximum token quantity condition may include values that indicate to sender node 106 to reject cryptographically signed token requests that contain token amounts below a minimum threshold or above a maximum threshold. For example, a maximum token quantity may be 1000 tokens and a minimum threshold may be 10 tokens. In such an example, if sender node 106 receives a cryptographically signed token request, from receiver node 104A, that includes a request for 1007 tokens or 5 tokens the cryptographically signed token request will be rejected and no tokens will be distributed.

The distribution time period may include a time value that indicates to sender node 106 a particular time period wait before distributing tokens. For example, a distribution time period may be 2 hours. In such an example, if sender node 106 receives a cryptographically signed token request and does not reject the request for various reasons (e.g., other distribution conditions are not met) then sender node 106 may wait 2 hours before distributing tokens. The distribution time period may enable the withdrawal of a token request during the duration of the distribution time period.

The geographical location may include an indicator that indicates to sender node 106 a particular location region that may be required to be associated with a cryptographically signed token request. In such an example, if sender node 106 receives a cryptographically signed token request that has an associated location of Dallas Tex., but a geographical location requirement indicates to sender node 106 the region of New York, then sender node 106 may not distribute tokens in response to receiving the cryptographically signed token request.

The user characteristic may include an indication of one or more user characteristics of a user associated with a cryptographically signed token request. For example, a user characteristic may be that a user associated with a cryptographically signed token request has been authenticated, is not on a blacklist, is on a whitelist (e.g. Know-Your-Customer (KYC) verified), is legally allowed to receive tokens (e.g., is in compliance with certain government laws), and the like. In such an example, prior to distributing any tokens, sender node 106 may determine a user associated with a received cryptographically signed token request. Sender node 106 may then query distributed ledger 120 to determine if an entry on distributed ledger 120 satisfies the user characteristic condition. For example, a user characteristic condition may require a user associated with a cryptographically signed token request to successfully complete a KYC process. In such an example, management system 112, may perform the KYC process and write into a block in the custom blockchain the result of the KYC process. Sender node 106 may then query distributed ledger 120 to locate the entry indicating the result of the KYC process and determine if the user characteristic is met. In one embodiment, sender node 106 may only satisfy the user characteristic condition with entries in the customized blockchain that are signed by management system 112 (or a trusted party).

Sender node 106 may receive data from distributed ledger 120. Distributed ledger 120 may comprise one or more blocks of a customized blockchain. Sender node 106 may query the customized blockchain to determine if one or more allocation conditions and/or distribution conditions are met. In one embodiment, sender node 106 may query the customized blockchain for entries signed by management system 112 or a trusted entity to determine if one or more conditions are met.

Sender node 106 may write data associated with token parameters and/or distribution parameters to distributed ledger 120. Sender node 106 may initialize distributed ledger 120 upon creation of a customized blockchain and may write to one or more blocks in the customized blockchain information associated with the token parameters such as the amount of a token that has been created and the name of the created tokens. Sender node 106 may write to the customized blockchain whenever sender node 106 distributes tokens. In one embodiment, tokens may be distributed by associating an address associated with a cryptographically signed token request with one or more created tokens. For example, sender node 106 may receive a cryptographically signed token request for 100 tokens. The request may be associated with address 1345456. When sender node 106 distributes the 100 tokens it may write to a block in the custom blockchain "100 tokens to 1345456." Once the block is processed by one or more components of computer network 100, distributed ledger 120 may contain the block with the entry "100 tokens from 45545 to 1345456." 45545 being an address associated with sender node 106. As a result, one or more components of computer network 100 may openly view every transaction associated with the tokens of the customized blockchain.

Sender node 106 may write data associated with allocation parameters to distributed ledger 206. Distributed ledger 206 may be associated with an underlying pre-existing blockchain. When a custom blockchain is built on top of an underlying pre-existing blockchain one or more transactions associated with the custom blockchain may also be a part of the underlying pre-existing blockchain. In one embodiment, a resource included in a cryptographically signed token request may be an asset associated with the underlying pre-existing blockchain. For example, a cryptographically signed token request may include 100 Ether, which is a token used for transactions in on the Ethereum blockchain. In such an example, distributed ledger 206 may comprise one or more blocks of the Ethereum blockchain. When receiver node 104A sends an asset associated with an underlying pre-existing blockchain to sender node 106 the receiver node 104A may write to a block in the underlying pre-existing blockchain "address 1 sends 100 assets to address 2." Address 1 being an address associated with receiver node 104A and address 2 to being an address associated with sender node 106. Subsequently, in response to allocation conditions being met, sender node 106 allocates the received assets. To allocate the received assets, sender node 106 may write to a block in the underlying pre-existing blockchain "address 2 sends 100 assets to address 3." Address 3 being an address associated with sender device 110. By writing to a blocks associated with the underlying pre-existing blockchain, sender node 106 may write to distributed ledger 206.

Figure 3:
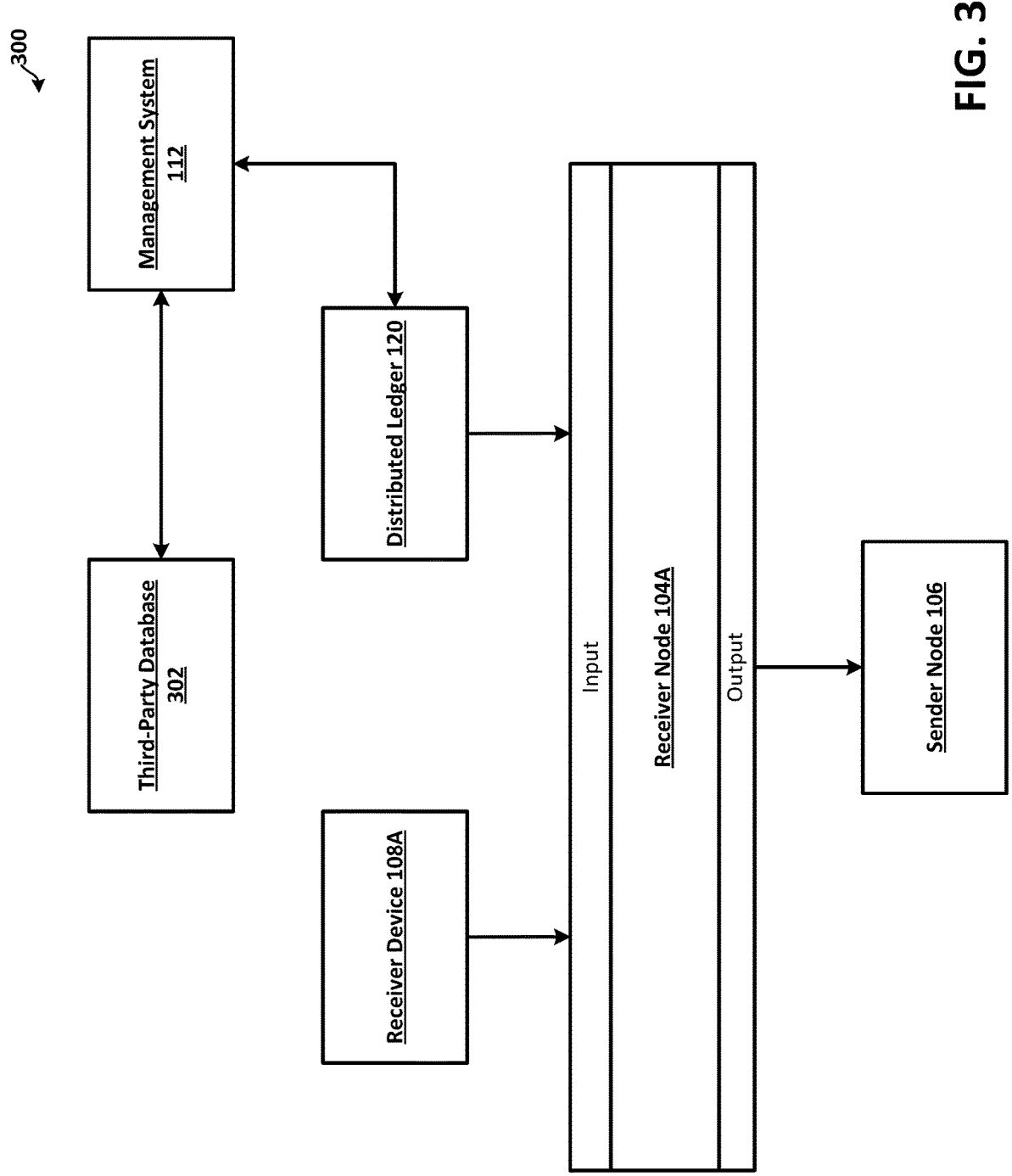
FIG. 3 illustrates a schematic diagram of a receiver node, in accordance with various embodiments of the present invention.

FIG. 3 depicts schematic diagram 300 illustrating example inputs and outputs associated with receiver node 104A. Although FIG. 3 may be described by explicitly referencing receiver node 104A, it is within the scope of this disclosure, to apply all functionalities and teachings associated with receiver node 104A to any receiver node in computer network 100. As depicted in diagram 300, receiver node 104 may receive data from receiver device 108A and distributed ledger 120. Receiver node 104A may transmit data to sender node 106.

Receiver device 108A may transmit, to receiver node 104A, a cryptographically signed token request. The cryptographically signed token request may be signed by a private key associated receiver device 108A. In one embodiment, a user of receiver device 108A may have one or more user accounts and the private key may be associated with the one or more user accounts. In such an embodiment, each user account may have an address that may be used to identify the user account. The cryptographically signed token request may include an address associated with the request, a token name, a token quantity, a resource, and one or more receiver parameters. The address associated with the request may be an address associated with one or more user accounts. The address may be a 16 alphanumeric value or any other type of unique identifier. The user account associated with the address may be an account that may be allocated one or more received tokens. For example, if a cryptographically signed token request is requesting authentication tokens, a user account identified by the address may be capable of being allocated the requested authentication tokens. In one embodiment, a user account is capable of being allocated the requested authentication tokens if the user account is assigned a private and public key associated with a blockchain (i.e. the custom blockchain) associated with the authentication token.

The token name may indicate the name of a requested token. For example, the token name may be string "authentication token", which may indicate that a token named "authentication token" is being requested. The quantity of tokens requested may indicate the amount of tokens requested. For example, the quantity of tokens requested may be the value "500", which may indicate that 500 authentication tokens are being requested. The resource may indicate one or more resources that may be allocated to another owner in return for the requested tokens. For example, a resource may be 100 XLM, which may indicate that 500 authentication tokens are being requested in exchange for 100 XLM.

The one or more receiver parameters may define or more receiver conditions that must be satisfied prior to a receiver node sending the received cryptographically token request to sender node 106. The receiver parameters may include a quantity of tokens distributed threshold, a quantity of valid token requests threshold, an event identifier, and a confidence value associated with the event identifier. The quantity of tokens distributed threshold may indicate to receiver node 104A a threshold value associated with the number of tokens previously distributed. For example, a quantity of tokens distributed threshold may be 10%, which may indicate to receiver node 104A that at least 10% of the tokens must be distributed in order for the receiver condition to be satisfied. For example, if a cryptographically signed token request indicates a request for authentication tokens, receiver node 104A may query distributed ledger 120 to determine the initial quantity of authentication tokens and all instances where authentication tokens were initial distributed from sender node 106. Receiver node 104A may then calculate the percentage of authentication tokens distributed to determine if the receiver condition has been met.

The quantity of valid token requests threshold may indicate to receiver node 104A a threshold value associated with a number of valid token requests received by sender node 106. A valid token request may be a cryptographically signed token request that has met the distribution conditions of sender node 106. In one embodiment, whenever a cryptographically signed token request is sent to sender node 106 the request is written to the custom blockchain. In one embodiment, whenever a cryptographically signed token request is rejected by sender node 106, the rejection is written to a block in the custom blockchain. Receiver node 104A may query distributed ledger 120 to determine how many cryptographically signed token request were received by sender node 106 but do not also have a subsequent rejection. In such an embodiment, receiver node 104A need not query distributed ledger 120 for distributed tokens because an instance may exist where a cryptographically signed token request has been received and is valid, but there is not a token distribution (e.g., when distribution time period has not been met).

The event identifier may indicate, to receiver node 104A, a particular event that must occur. An event may be filing a permit or other documentation with a government agency, a medical license has been granted, photos exist showing a particular thing exists (e.g., a building at a certain location exists), an occupancy rate of a building or development, and the like. In one embodiment, management system 112 may, via one or more API calls or other means, retrieve data to determine if an event has occurred. For example, management system 112, may query a third-party database 302, to retrieve a plurality of photos for a certain location, based on the retrieved photos, management system 112 may write to a block in the custom blockchain "23 photos of building X have been retrieved indicating building X exists, satisfying event 1353." Third-party database 302 may be a social media database, a Google® database, a Yelp® database, and the like. Receiver node 104A may query distributed ledger 120, using the string "event 1353" to retrieve one or more entries associated with the event. Based on the retrieved entry(ies), receiver node 104A may determine if an event has occurred. In one embodiment, receiver node 104A may only retrieve entries signed by management system 112 (or a trusted party) to determine if an event has occurred.

In one embodiment, an event identifier may also have an associated confidence value. A confidence value may indicate the likelihood of data being trusted. In one embodiment, in order for receiver node 104A to determine that an event occurred, there must be an associated confidence value above a certain threshold. For example, management system 112, a third-party server associated with third-party database 302, a government server, or one or more components of computer network 100, may write to a block in the custom block chain that "a photo of building X has been retrieved." Because this information may not come from a trusted party, it is possible the data included in a block in the custom blockchain may be malicious. In an effort to mitigate relying on malicious activity, receiver node 104A may query distributed ledger 120 to find multiple instances of entries indicating photos of building X. Receiver node 104A may then calculate a confidence value based on the retrieved entries from distributed ledger 120. The confidence value may be calculated based on a weight associated with the entity that signed the entry. For example, an entry signed by a third-party server associated with third-party database 302 may be weighed less than an entry signed by management system 112. The confidence value may also be calculated based on the amount of corresponding entries. For example, if there are 23 entries that indicate a photo exists for building X and 4 entries that contradict that building X exists (e.g., an entry stating "building X does not exist, no building permit has been found") then a high confidence value may be calculated because there are vastly more entries that indicate building X exist. Because multiple parties may enter information into a blockchain, it may beneficial to crowdsource information related to certain conditions and determine certain conditions are met based on a confidence value associated with the data.

Receiver node 104A may receive data from distributed ledger 120. Distributed ledger 120 may comprise one or more blocks of a customized blockchain. Receiver node 104A may query distributed ledger 120 to determine if one or more receiver conditions are met. In one embodiment, receiver node 104A may query distributed ledger 120 for entries signed by management system 112 or a trusted entity to determine if one or more reeciver conditions are met. In one embodiment, receiver node 104A (and other nodes of computer network 100) may query distributed ledger 120 for entries, signed by anyone, related to one or more receiver conditions to crowdsource data and determine if the crowdsourced data has a confidence value above a certain threshold to determine that a receiver condition has been met.

Upon satisfying one or more receiver conditions, receiver node 104A may transmit received cryptographically signed token request to sender node 106. Sender node 106 may then determine if the cryptographically signed request satisfies one or more distribution conditions. Receiver node 104A may write, to the custom blockchain, the transmission of the received cryptographically signed token request. In one embodiment, entries in the custom block chain may be encrypted such to comply with laws (e.g. General Data Protection Regulation (GDPR)) and to protect personal identifiable information. For example, an entry in the customize blockchain that identifies an individual, such as "David Thomas on Mar. 26, 2015 took a photo of building X" may be encrypted or obfuscated to the human eye to hide the name "David Thomas." In one embodiment, entries in the custom blockchain may be computer or machine readable, but not human readable.

Figure 4:
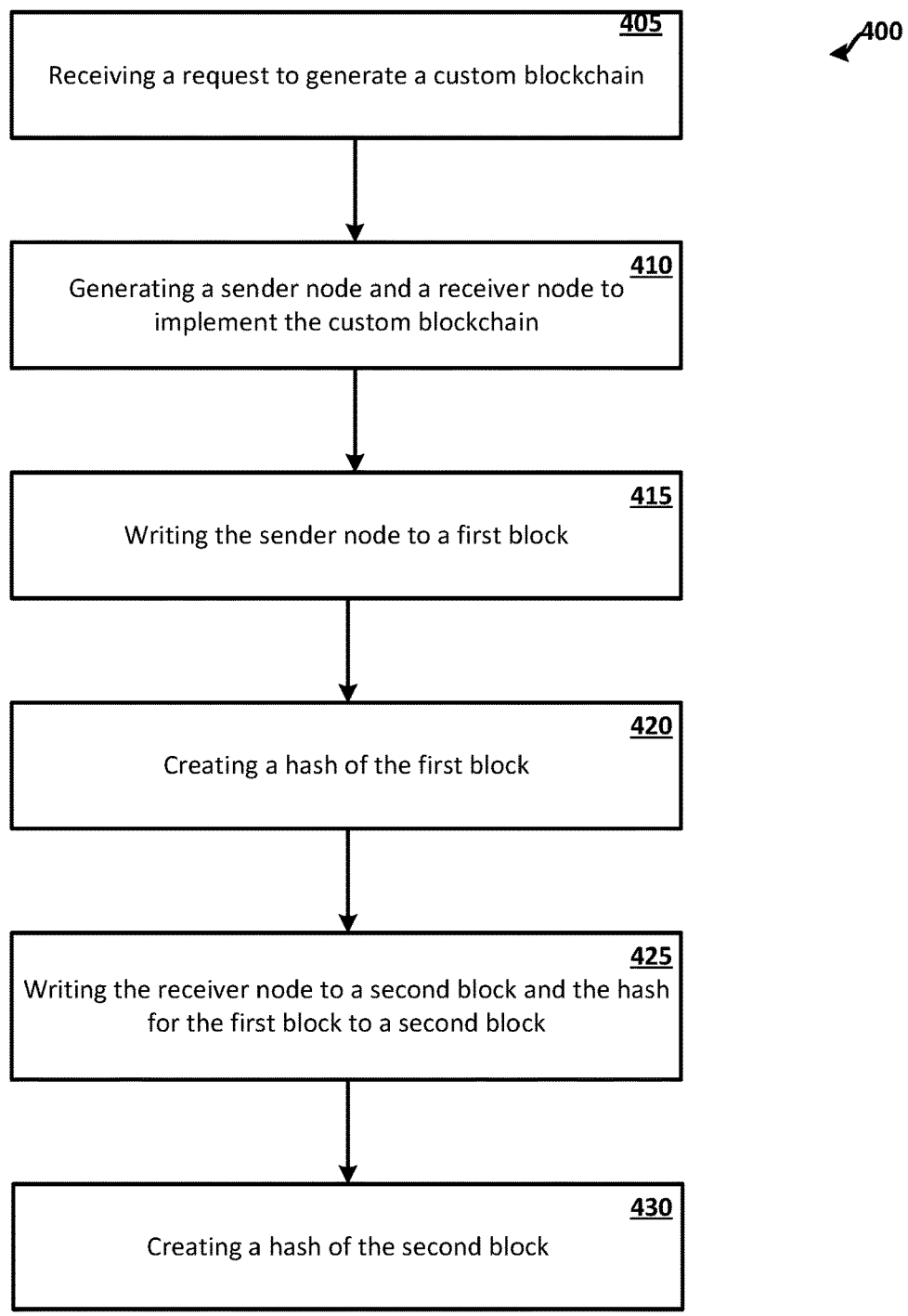
FIG. 4 illustrates a first process of one or more parts of a computer network, in accordance with various embodiments of the present invention.

FIG. 4 illustrates process 400 for creating a decentralized application on a customized blockchain. Process 400 may be implemented by one or more parts of computer network 100. At 405, management system 112, receives a request to generate a custom blockchain. The request to generate the custom blockchain may be received from sender device 110 and may include potential token parameters. Sender device 110 may be associated with an entity or a user. For example, the request to create a custom blockchain may request a custom blockchain to be created for a token named "authentication token" and for 1000 authentication tokens to be created. In one embodiment, the potential token parameters may further include a requested underlying pre-existing blockchain platform. For example, Ethereum, Stellar, Cardano, EOS, and the like.

At 410, management system 112, generates a sender node 106 and a receiver node 104A to implement the custom blockchain. The sender node 106 and receiver node 104A may be implemented each as computerized protocols that may, based upon one or more conditions, facilitate, mange, verify and/or control one or more transactions associated with the custom blockchain. In one embodiment, sender node 106 and receiver node 104A may together make up decentralized application 102.

At 415, management system 112 writes sender node 106 to a first block in an underlying pre-existing blockchain. In one embodiment, writing sender node 106 to a first block entails writing, in a coding language, the computerized protocol that makes up sender node 106 to the first block, such that the computerized protocol is executable by a plurality of devices in computer network 100.

At 420, one or more devices in computer network 100 creates a hash of the first block. The hash may be created by any known algorithm, including SHA-256. One or more pieces of data (including sender node 106) are written to the first block. The first block is then processed according to a block validator algorithm and the first block is added to the underlying pre-existing blockchain. Once added, one or more devices of computer network 100 creates a hash of the first block to use as an input into a second block of the underlying pre-existing blockchain.

At 425, management system 112 writes receiver node 104A and the hash of the first block to a second block in the underlying pre-existing blockchain. In one embodiment, writing receiver node 104A to a second block entails writing, in a coding language, the computerized protocol that makes up receiver node 104A to the second block, such that the computerized protocol is executable by a plurality of devices in computer network 100. In addition to receiver node 104A, the hash of the first block is also included in the second block. By including the hash of the first block in the second block it cryptographically links the first and second blocks creating an immutable chain of blocks.

At 430, one or more devices in computer network 100 creates a hash of the second block. The hash of the second may be created by any known algorithm, including SHA-256. One or more pieces of data (including receiver node 104A and the hash of the first block) are written to the second block. The second block is then processed according to a block validator algorithm to add the second block to the underlying pre-existing blockchain. Once added, one or more devices of computer network 100 creates a hash of the second block to use as an input into a third block of the underlying pre-existing blockchain. The process of creating a block, hashing the block, and including the hash into a subsequent block may repeated as many times as needed to create as long of a blockchain as needed.

Figure 5:
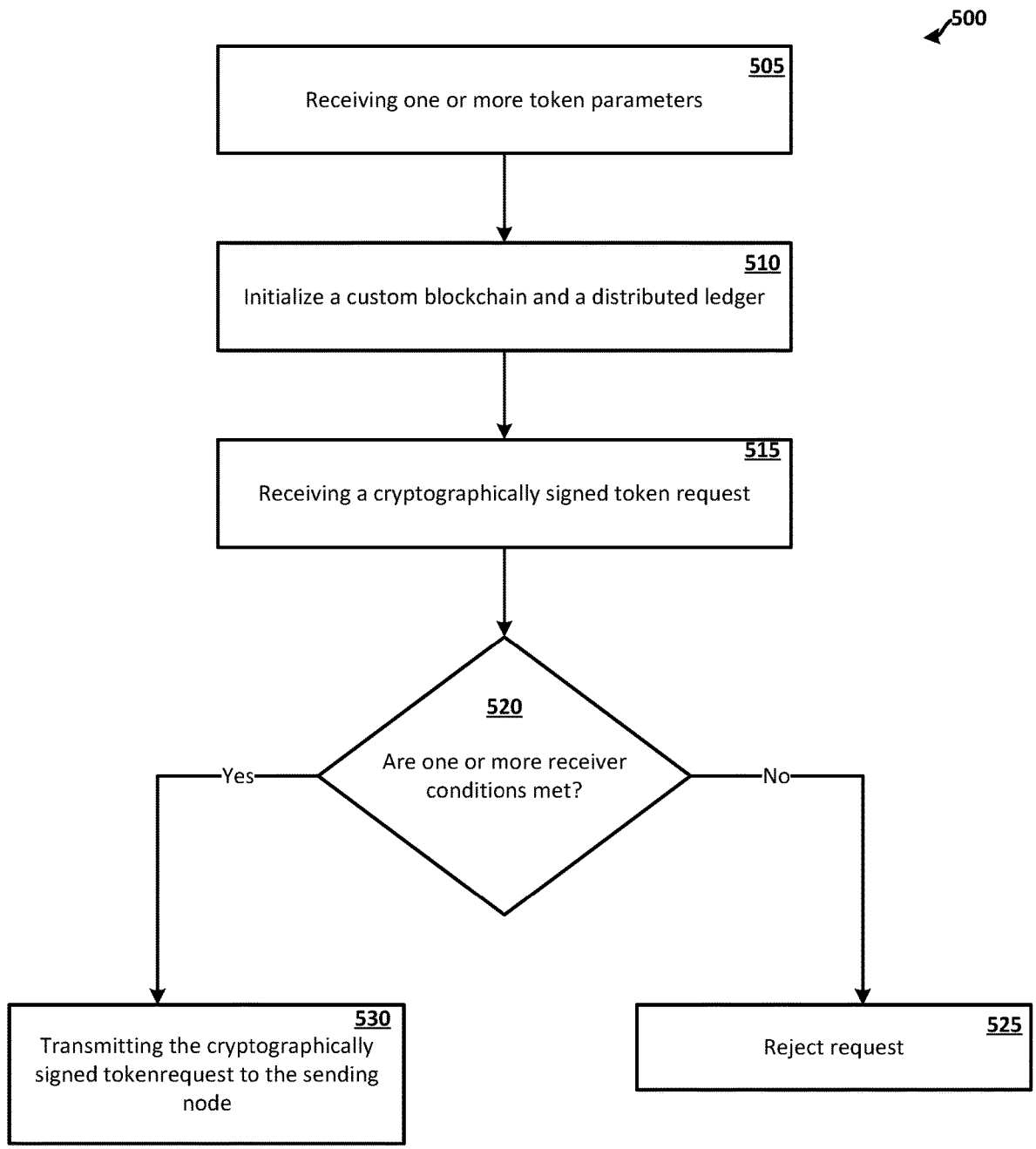
FIG. 5 illustrates a second process of one or more parts of a computer network, in accordance with various embodiments of the present invention.

FIG. 5 illustrates process 500 for creating a custom blockchain and determining whether to forward a cryptographically signed token request to sender node 106. Process 500 may be performed by one or more devices of computer network 100. At 502, sender node 106 receives one or more token parameters from management system 112. The one or more token parameters may be derived from the potential token parameters (at 405). The token parameters may indicate to sender node 106 to create a custom blockchain. Each custom blockchain may have an associated set of tokens. The set of tokens may be generated based on the token parameters. Token parameters may include a quantity of initial tokens, a name of the initial tokens, access rights associated with the initial token, a value associated with the initial tokens, and the like.

At 510, sender node 106 initializes the customized blockchain with associated distributed ledger 120. Based on the received token parameters, sender node 106 may initialize a custom blockchain and corresponding distributed ledger 120. Distributed ledger 120 may comprise one or more blocks of the customized blockchain. The customized blockchain may be initialized according to a token quantity and a token name. For example, the token parameters may indicate to sender node to initialize a blockchain (i.e. write a first block of the customized blockchain) by creating a token and an quantity of the token. For example, the first block of a customized blockchain may contain data that initiates 1000 authentication tokens.

At 515, receiver node 104A receives, from receiver device 108A, a cryptographically signed token request. The cryptographically signed token request may be signed by a private key associated with receiver device 108A. Receiver device 108A may be associated with a user (e.g., investor). The cryptographically signed token request may be written to a block of the custom blockchain. The cryptographically signed token request may include an address associated with receiver device 108A, a token name, a quantity of tokens requested, a resource, and one or more receiver parameters. For example, the cryptographically signed request may indicate the address 123456789qwertyui, the token name "authentication token", the quantity 50, the resource 10 resources, and an event indicator of a building existing at 3250 South Blvd, San Francisco, Calif.

At 520, receiver node 104A determines if one or more receiver conditions are met. The receiver conditions are based on the received receiver parameters. For example, a receiver parameter may be an event indicator, which may indicate to receiver node 104A that a certain event must occur in order for the receiver condition to be satisfied. Receiver node 104A may query distributed ledger 120 to retreive one or more entries associated with the event indicator to determine if an event has occurred. In one embodiment, receiver node 104A may search for entries signed by management system 112 to determine if an event has occurred. In one embodiment, receiver node 104A may crowdsource multiple entries to determine if an event has occurred. For example, distributed ledger 120 may have one or more entries that indicate photos associated with the address 3250 South Blvd, San Francisco, Calif. In one embodiment, if the entries are signed by management system 112 then receiver node 104A may determine that the receiver condition has been satisfied and process 500 moves to 530. However, if it is determined that the receiver condition has not been satisfied process 500 moves to 525 and the cryptographically signed token request is rejected. The rejection of the cryptographically signed token request may be written to the custom blockchain.

At 530, receiver node 104A transmits the cryptographically signed token request to sender node 106. The transmission may be written to a block in the custom blockchain.

Figure 6:
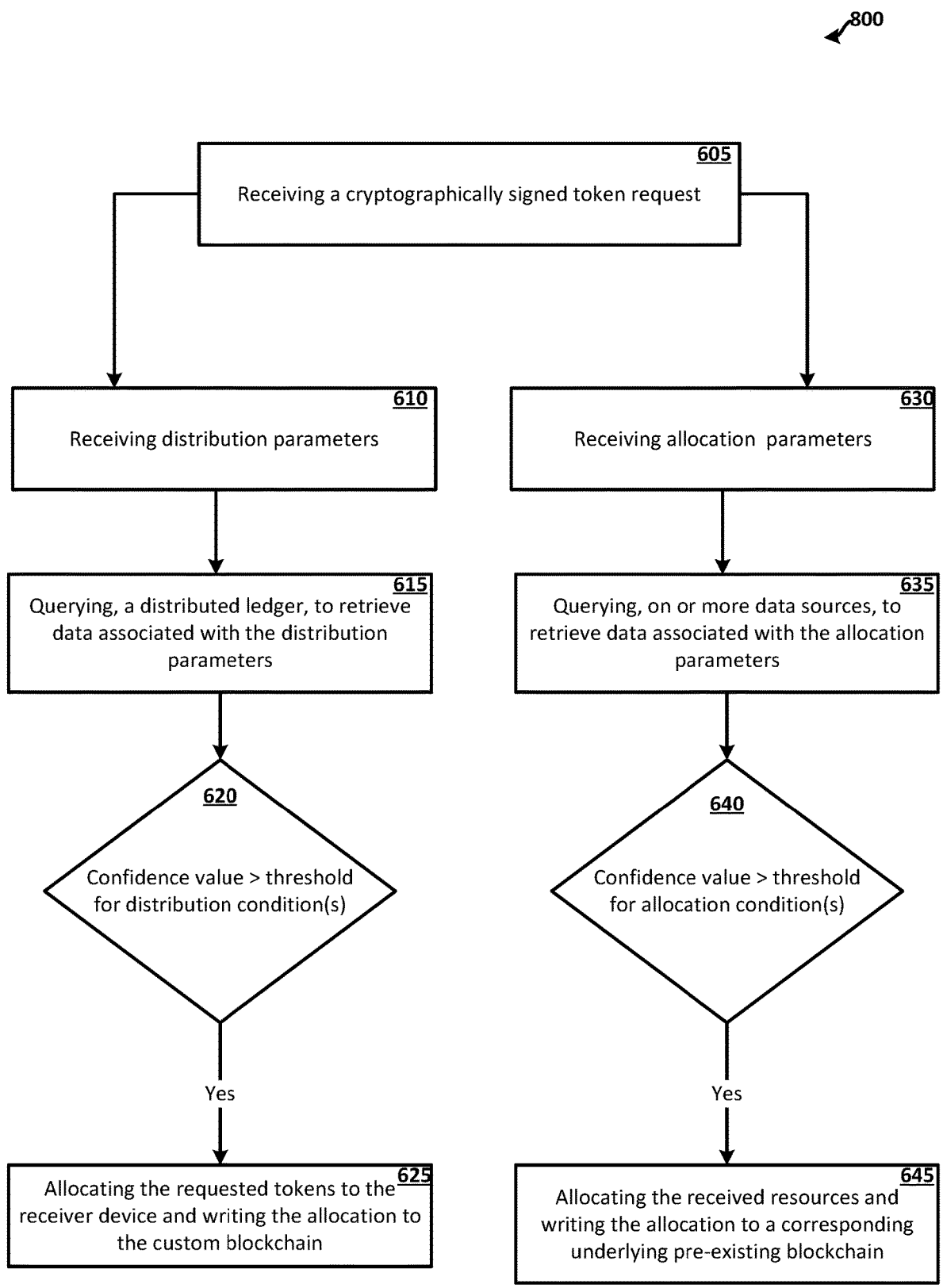
FIG. 6 illustrates a third process of one or more parts of a computer network, in accordance with various embodiments of the present invention.

FIG. 6 illustrates process 600 for determining if one or more distribution conditions and one or more allocation conditions are satisfied. Process 600 may be performed by one or more devices in computer network 100. At 605, sender node 106 receives, from receiver node 104A, a cryptographically signed token request. This cryptographically signed token may be the cryptographically signed token request transmitted at 530.

At 610, sender node 106 receives from either sender device 110 or management system 112, one or more distribution parameters. The distribution parameters that may indicate to sender node 106 one or more distribution conditions associated with the tokens created by sender node 106. These distribution conditions may indicate a certain set of rules for distributing one or more created tokens. Distribution conditions may include a minimum and maximum resource, a minimum and maximum token quantity, a distribution time period, a user characteristic and the like. For example distribution conditions may indicate a minimum resource of 1 resource a maximum resource of 100 resources, a minimum token quantity of 45 authentication tokens, a maximum token quantity of 100 authentication tokens, a distribution time period of 2 hours, and a user characteristic of a user associated with receiver device 108A has been previously authenticated by a system.

At 615, sender node 106 queries distributed ledger 120 to retrieve data associated with the distribution parameters. In one embodiment, sender node 106 will query distributed ledger 120 for entries associated with the distribution parameters that are signed by management system 112 or another trusted entity. For example, sender node 106 may query distributed ledger 120 to retrieve one or more entries that indicate a user associated with receiver device 108A has been authenticated by management system 112. In such an example, an entry in distributed ledger 120 may be "On Jan. 12, 2015 the user associated with 123456789qwertyui the address has been authenticated by management system 112." Such an entry would be signed by a private key associated with management system 112. In one embodiment, sender node 106 may query distributed ledger 120 for entries associated with the distribution parameters that are signed by anyone. In such an example, an entry in distributed ledger 120 may be "On Jul. 5, 2015, a user associated with device 23534 confirms that the user associated with receiver device 108A is who they say they are." Such an entry would be signed by a private key associated with device 23534. Device 23534 may be a receiver device in computer network 100.

At 620, sender node 106 determines if a confidence value is greater than a threshold for one or more distribution conditions. A confidence value may indicate the likelihood of data being trusted. For example, in order for sender node 106 to determine that a user associated with receiver device 108A has been previously authenticated by a system, there must be an associated confidence value above a certain threshold. In one embodiment, a threshold may be exceeded if an entry in distributed ledger 120 is signed by a trusted party. For example, an entry in distributed ledger 120 of "On Jan. 12, 2015 the user associated with 123456789qwertyui the address has been authenticated by management system 112" signed by management system 112 may exceed a confidence threshold because management system 112 is a trusted party. In one embodiment, the confidence value may be calculated based on a weight associated with the entity that signed an entry. For example, an entry signed by another receiver device in computer network 100 may be weighed less than an entry signed by a third-party server owned and operated by a Fortune 500 company. The confidence value may also be calculated based on the amount of corresponding entries. For example, if there are 50 unique entries that indicate a user associated with receiver device 108A has been authenticated by a system and 4 unique entries that contradict that the user has been authenticated, a high confidence value may be calculated because there are vastly more unique entries that indicate the user associated with receiver device 108A has been authenticated by a system. If the confidence value for one or more distribution parameters exceeds the threshold process 600 moves to 625.

At 625, sender node 106 allocates the requested tokens to receiver device 108A and writes the allocation to the custom blockchain. Sender node 106 may allocate the requested tokens by associating an address associated with receiver device 108A with the requested tokens. Such an address may be the address included in the cryptographically signed token request received at 605. Sender node 106 may also write the allocation to the custom blockchain in order to cryptographically monitor the distribution of the tokens. For example, sender node 106 may write into a block in the custom blockchain "Sender node 110 transmits 50 authentication tokens to 123456789qwertyui."

At 630, sender node 106 receives from management system 112 allocation parameters. Allocation parameters may indicate to sender node 106 one or more allocation conditions, including but not limited to, a full or partial completion of one or more activities, a quantity of distributed tokens, and a quantity of received resources. For example, an allocation condition may be that a user associated with sender device 110 has filed for a permit with a government agency.

At 635, sender node 106 queries distributed ledger 120 to retrieve data associated with the allocation parameters. In one embodiment, sender node 106 may query distributed ledger 120 for entries, signed by management system 112 or another trusted party, associated with the allocation parameters. For example, sender node 106 may query distributed ledger 120 to retrieve one or more entries that indicate a user associated with sender device 110 has filed for a permit with a government agency. In such an example, an entry in distributed ledger 120 may be "On Jan. 25, 2016 a user associated with 123456789asdfghj has filed for a permit with a government agency." Such an entry would be signed by a private key associated with management system 112. The address of 123456789asdfghj may be the address of a user account associated with a user of sender device 110. In one embodiment, sender node 106 may query distributed ledger 120 for entries associated with the allocation parameters that are signed by anyone. In such an example, an entry in distributed ledger 120 may be "On Jul. 8, 2016, a user associated with device 23534 confirms that a user associated with 123456789asdfghj has received a permit from government agency." Such an entry would be signed by a private key associated with device 23534. Device 23534 may be a receiver device in computer network 100. This information may indicate to sender node 106 that a permit been filed (and received) with a government agency.

At 640, sender node 106 determines if a confidence value is greater than a threshold for one or more allocation conditions. A confidence value may indicate the likelihood of data being trusted. For example, in order for sender node 106 to determine that a user associated with sender device 110 has filed for a permit with a government agency, there must be an associated confidence value above a certain threshold. In one embodiment, a threshold may be exceeded if an entry in distributed ledger 120 is signed by a trusted party. For example, an entry in distributed ledger 120 of "On Jan. 25, 2016 the user associated with 123456789asdfghj has been filed for a permit with a government agency" signed by management system 112 may exceed a confidence threshold because management system 112 is a trusted party. In one embodiment, the confidence value may be calculated based on a weight associated with the entity signed an entry. For example, an entry signed by another receiver device in computer network 100 may be weighed less than an entry signed by a third-party server owned and operated by a Fortune 500 company. The confidence value may also be calculated based on a quantity of unique corresponding entries. For example, if there are 60 unique entries that indicate a user associated with sender device 110 has filed for a permit with a government agency and 3 entries that contradict that the user has filed a permit, then a high confidence value may be calculated because there are vastly more entries that indicate the user associated with sender device 110 has filed the permit. If the confidence value for one or more distribution parameters exceeds the threshold process 600 moves to 645.

At 645, sender node 106 allocates the received resources associated to sender device 110 and writes the allocation to the custom blockchain. Sender node 106 may allocate received resources associated with the received cryptographically signed token request (at 805) by associating an address associated with sender device 110 with the received resources. Such an address may be an address associated with a user of sender device 110. Sender node 106 may also write the allocation to a block in the underlying pre-existing blockchain. In addition, sender node 106 may also write an indication of the allocation to a block in the custom blockchain. For example, sender node 106 may write into a block in the custom blockchain "Sender node transmits 50 resources to 123456789asdfghj." Such an entry may be also be written to a block of the underlying pre-existing blockchain. By writing the allocation to the underlying pre-existing blockchain a user account associated with receiver device 108A may have a quantity of resources removed and a user account associated with sender device 110 may add the quantity of resources. At the same time, by writing the allocation to the custom blockchain, a token quantity associated with sender node 106 may be removed and the token quantity may be added to an account associated with receiver device 108A.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. For example, one more operations associated with sender node 106 and receiver node 108A may occur at different time periods. In such an example, tokens may be created at a first time, receiver conditions may be checked at a second time, distribution conditions may be checked at a third time, and allocation conditions may be checked at a fourth time. The specification and drawings are, accordingly, to be regarded as illustrative rather than restrictive.

What is claimed:

1. A method comprising:
receiving, from a sending device, one or more first communications that correspond to a request to generate a custom blockchain, the one or more first communications including a plurality of token parameters;
initializing a sender node;
initializing a receiver node;
writing the sender node into a first block in an underlying pre-existing blockchain, the sender node being associated with a first blockchain address;
writing the receiver node into a second block in the an underlying pre-existing blockchain, the receiver node being associated with a second blockchain address;
receiving, by the sender node, at least one token parameter of the plurality of token parameters and at least one distribution parameter;
initializing, based on the at least one token parameter, a first distributed ledger, the first distributed ledger identifying one or more actions associated with a custom blockchain, the custom blockchain being distinct from the an underlying pre-existing blockchain;

receiving, by receiver node, a cryptographically signed request for custom tokens associated with the custom blockchain, the cryptographically signed request being generated based at least on, a private key associated with a receiving device;

comparing, by the receiver node, one or more receiver conditions associated with the cryptographically signed request to one or more actions identified in the first distributed ledger to determine that the one or more receiver conditions are satisfied;

transmitting, from the receiver node to the sender node, the cryptographically signed request;

comparing, by the sender node, data associated with the cryptographically signed request to the at least one distribution parameter to determine that a distribution condition is satisfied;

in response to determining that the distribution condition has been satisfied, generating, by the sender node, a token distribution response;

broadcasting, by the sender node, the token distribution response to a plurality of computing devices associated with the custom blockchain;

writing, by one of the plurality of computing devices associated with the custom blockchain, the token distribution response in a third block of the custom blockchain;

modifying the first distributed ledger to include the token distribution response; and retrieving, by the receiving device, the first distributed ledger.

2. The method of claim 1, wherein the first block and the second block are a same block.

3. The method of claim 1, wherein the first and second blocks are older than the third block.

4. The method of claim 1, wherein the plurality of computing devices associated with the custom blockchain includes the receiving device and the sending device.

5. The method of claim 1, wherein the token parameters include one or more of an initial token value or initial token supply.

6. The method of claim 1, wherein the distribution parameter includes a minimum value or a geographic region.

7. The method of claim 1, further comprising:
receiving, by the sender node, an allocation parameter;
querying, by the sender node, one or more data sources, to retrieve data associated with the allocation parameter;
generating, by the sender node, based on the data associated with the allocation parameter, an allocation response; broadcasting, by the sender node, the allocation response to a plurality of computer devices associated with the underlying pre-existing blockchain; and
modifying a second distributed ledger to include the allocation response, the second distributed ledger being associated with the underlying pre-existing blockchain.

8. A system comprising:
a computing device comprising one or more processors; and
a memory coupled with the one or more processors, the memory configured to store instructions that when executed by the one or more processors cause the one or more processors to:
retrieve a sender node, the sender node being in a first block in an underlying pre-existing blockchain;
retrieve a receiver node, the receiver node being in the first block in the underlying pre-existing blockchain;
receive at least one token parameter of a plurality of token parameters and at least one distribution parameter;
initialize, based on the at least one token parameter, a first distributed ledger, the first distributed ledger identifying one or more actions associated a custom blockchain, wherein the custom blockchain operates in conjunction with the underlying pre-existing blockchain;
receive a cryptographically signed request for custom tokens associated with the custom blockchain, the cryptographically signed request being generated based at least on, a private key associated with a receiving device;
compare one or more receiver conditions associated with the cryptographically signed request to one or more actions identified in the first distributed ledger to determine that the one or more receiver conditions are satisfied;
compare data associated with the cryptographically signed request to the at least one distribution parameter to determine that a at least one distribution condition is satisfied;
in response to determining that the at least one distribution condition has been satisfied, generate a token distribution response;
broadcast the token distribution response to a plurality of computing devices associated with the custom blockchain;
cause one of the plurality of computing devices associated with the custom blockchain to write the token distribution response to a block of the custom blockchain;
cause a modification of the first distributed ledger to include the token distribution response; and
retrieve the first distributed ledger.

9. The system of claim 8, wherein the plurality of computing devices associated with the custom blockchain includes the receiving device and a sending device.

10. The system of claim 8, wherein the at least one token parameter includes one or more of an initial token value or initial token supply.

11. The system of claim 8, wherein the at least one distribution parameter includes a minimum value or a geographic region.

12. The system of claim 8, wherein the instructions that when executed by the one or more processors further cause the one or more processors to:
receive an allocation parameter;
query, one or more data sources, to retrieve data associated with the allocation parameter;
generate, based on the data associated with the allocation parameter, an allocation response;
broadcast the allocation response to a plurality of computer devices associated with an the underlying pre-existing blockchain, the custom blockchain being distinct from the underlying pre-existing blockchain; and
cause a modification to a second distributed ledger to include the allocation response, the second distributed ledger being associated with the underlying pre-existing blockchain.

13. A non-transitory computer-readable storage medium storing instructions that when executed by one or more processors, cause the one or more processors to perform operations including:
retrieve a sender node, the sender node being in a first block in an underlying pre-existing blockchain;

retrieve a receiver node, the receiver node being in the first block in the underlying pre- existing blockchain;

receive at least one token parameter of a plurality of token parameters and at least one distribution parameter;

initialize, based on the at least one token parameter, a first distributed ledger, the first distributed ledger identifying one or more actions associated a custom blockchain, wherein the custom blockchain operates in conjunction with the underlying pre-existing blockchain;

receive a cryptographically signed request for custom tokens associated with the custom blockchain, the cryptographically signed request being generated based at least on, a private key associated with a receiving device;

compare one or more receiver conditions associated with the cryptographically signed request to one or more actions identified in the first distributed ledger to determine that the one or more receiver conditions are satisfied;

compare data associated with the cryptographically signed request to the at least one distribution parameter to determine that a at least one distribution condition is satisfied;

in response to determining that the at least one distribution condition has been satisfied, generate a token distribution response;

broadcast the token distribution response to a plurality of computing devices associated with the custom blockchain;

cause one of the plurality of computing devices associated with the custom blockchain to write the token distribution response to a block of the custom blockchain;

cause a modification of the first distributed ledger to include the token distribution response; and retrieve the first distributed ledger.

14. The non-transitory computer-readable storage medium of claim 13, wherein the plurality of computing devices associated with the custom blockchain includes the receiving device and a sending device.

15. The non-transitory computer-readable storage medium of claim 13, wherein at least one token parameter includes one or more of an initial token value or initial token supply.

16. The non-transitory computer-readable storage medium of claim 13, wherein the at least one distribution parameter includes a minimum value or a geographic region.

17. The non-transitory computer-readable storage medium of claim 13, wherein the operations further including:

receiving an allocation parameter;

querying, one or more data sources, to retrieve data associated with the allocation parameter;

generating, based on the data associated with the allocation parameter, an allocation response;

broadcasting the allocation response to a plurality of computer devices associated with an the underlying pre-existing blockchain, the custom blockchain being distinct from the underlying pre-existing blockchain; and causing a modification to a second distributed ledger to include the allocation response, the second distributed ledger being associated with the underlying pre-existing blockchain.

* * * * *